D. D. McBEAN.
APPARATUS FOR CONSTRUCTING DRY DOCKS.
APPLICATION FILED JULY 21, 1914.

1,160,180.

Patented Nov. 16, 1915.
7 SHEETS—SHEET 2.

UNITED STATES PATENT OFFICE.

DUNCAN D. McBEAN, OF NEW YORK, N. Y.

APPARATUS FOR CONSTRUCTING DRY-DOCKS.

1,160,180. Specification of Letters Patent. Patented Nov. 16, 1915.

Application filed July 21, 1914. Serial No. 852,166.

*To all whom it may concern:*

Be it known that I, DUNCAN D. MCBEAN, a citizen of the United States, residing at New York, in the county and State of New York, have invented certain new and useful Improvements in Apparatus for Constructing Dry-Docks, of which the following is a full, clear, and exact description.

The subject of the invention upon which is based my present application for Letters Patent, is an improved apparatus primarily intended for use in the construction of such structures as dry docks for vessels and the like but applicable generally to such other purposes as unwatering sites for excavations to deepen channels and river bottoms, and it has for its objects the reduction of the expense involved in such operations, a more ready and easy means of excavating material from the site of the structure, and a more simple and effective plan of building the bottom and walls of the basin or chamber for the vessels.

In general terms, the invention involves the construction of a structure comprising or resting upon one or more air tight compartments of the general character of a closed or covered scow, which has sufficient buoyancy to float the entire structure, together with all its machinery appliances and appurtenances necessary for carrying out the objects of the invention. The dimensions of this structure are so proportioned with reference to the dry dock which it is contemplated to be built by its use, that it exceeds by about eight feet the total width of such dry-dock, that it has a length greater than a predetermined section of the same by the same amount or somewhat less, and that it is equal in height to the distance between the dry-dock floor level and the surface of the water at mean low tide.

The superstructure built upon the scow is substantially wider and longer than the latter and the overhanging portions are constructed to form air-tight spaces or compartments open at the bottom, and to the ends and sides of the whole device are secured at intervals vertical girders from which are supported the walings and the appliances for guiding the sheeting and permitting the structure to travel over the same after the latter has been driven, and occasion arises for raising or lowering the structure.

Omitting for the moment a description of the various appurtenances used with the device and necessary for its intended purpose, it is sufficient, for a general understanding of the invention, to state that the structure is floated to a point immediately over a section of the site for a dry-dock and then, by the introduction of water, which is pumped into the numerous compartments at the top, or permitted to flow into the scow, it is sunk until it rests upon the bottom. The device is then carefully leveled by filling more or less the various water compartments, and the sheeting around about the structure and also a certain number of piles passing through it, are then driven for a determined distance into the solid material. Compressed air is thereupon introduced in the space under the structure inclosed by the sheeting and under the side compartments, and when the space has been dewatered, the material below the device, the whole being lowered as occasion may require, is excavated or pumped out or removed in any suitable manner until the level for the foundation of the dry-dock is reached. The foundation and floor of the latter is then laid and the walls built up into the side compartments as far as the height of these will permit, and the structure is then raised to allow the further building up of these walls until their desired height is attained. A section of dry-dock having thus been built, the sheeting around the structure, as well as the piles that held it in place, are raised and the water having been pumped out of the compartments thereon, the whole structure is permitted to float. It is then shifted to a position over the site of the next section and the same process repeated with the foundation and floor and side walls, the device being used over and over for as many sections as there may be occasion to build.

In practically carrying out this invention, certain peculiar appliances and steps are necessary for successful operation, which I have not mentioned above, but which will be set forth in detail below. The general plan of the novel methods of construction outlined, however, will be understood from the description given, and it will be seen to involve the repeated use of a buoyant structure under which the material is excavated when necessary and the sections of dry-dock built up in a dewatered space inclosed by the sheeting surrounding the structure.

For the details of my invention I now refer to the accompanying drawings, in which—

Figure 1:
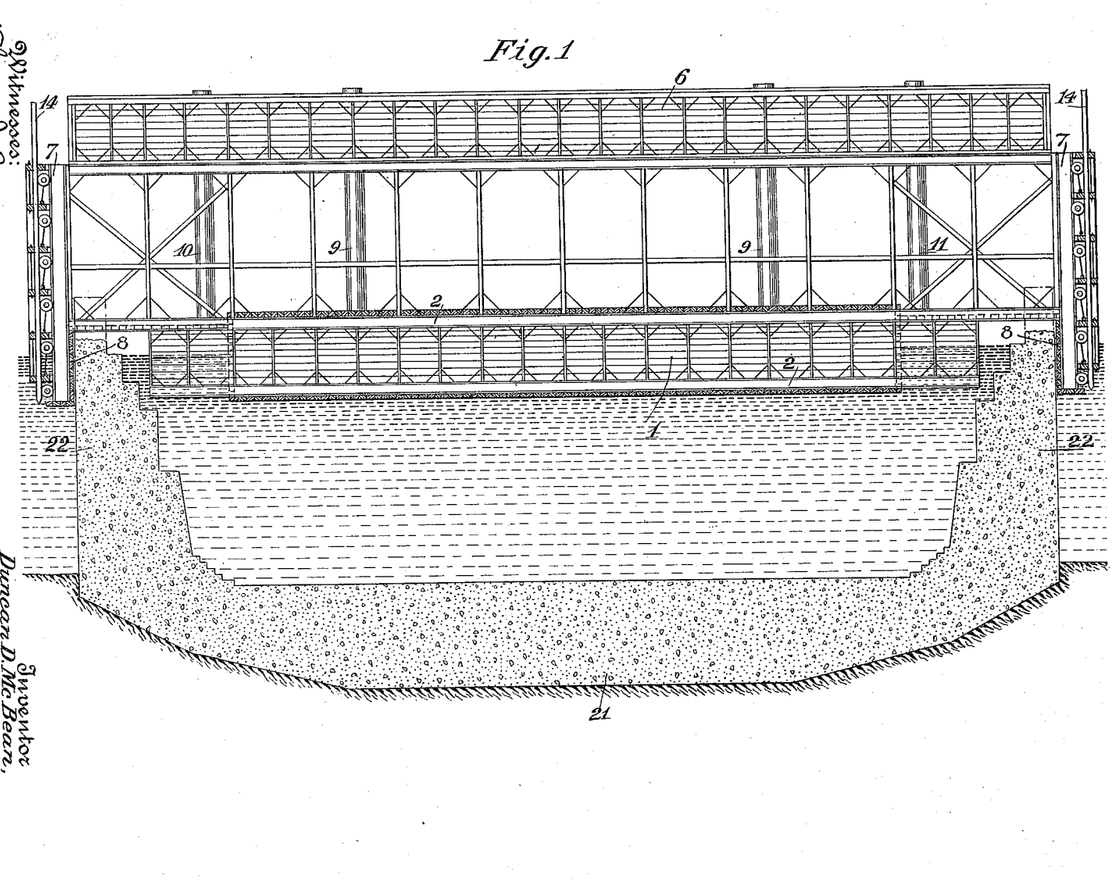
Figure 1 is a view partly in elevation and partly in cross-section of the structure floating over a partly constructed section of dry-dock.
Figure 2:
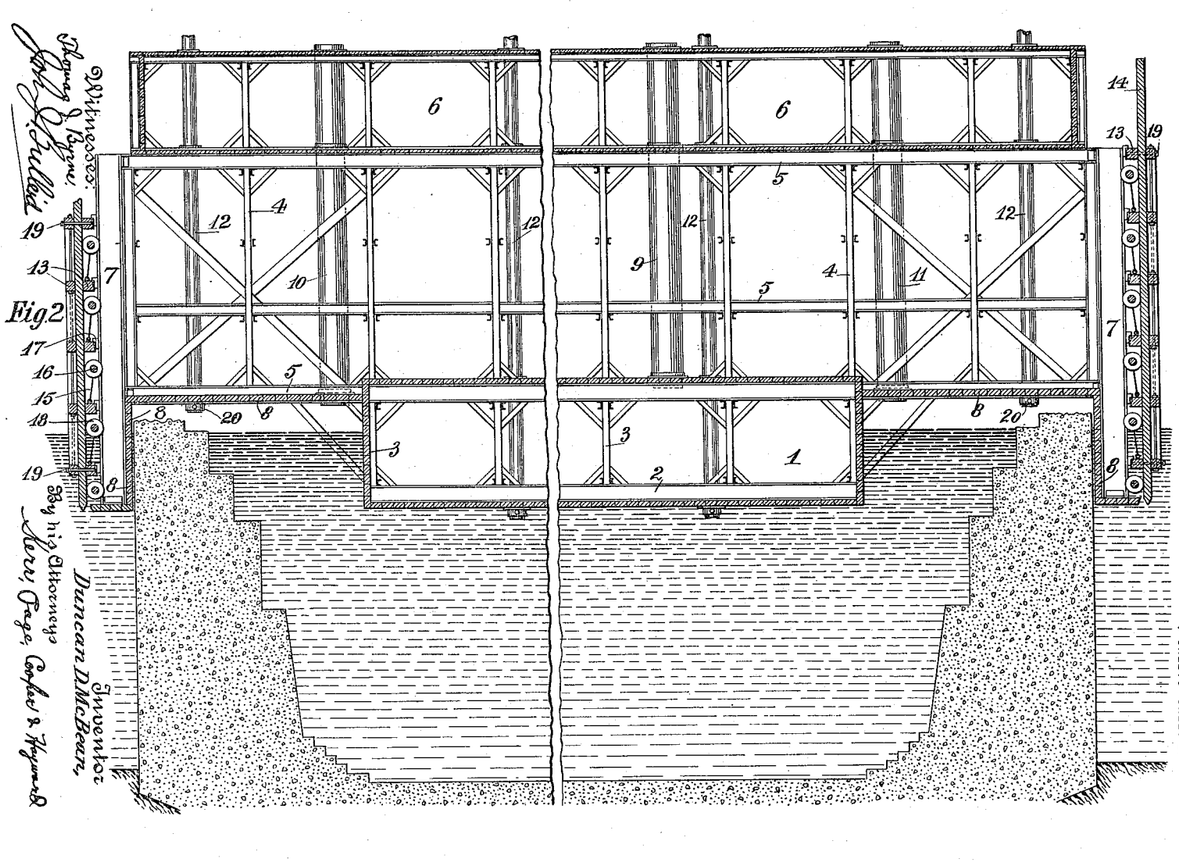
Fig. 2 is a cross-section of the same, but on an enlarged scale, and exhibiting the details of construction.

Referring now to Figs. 1 and 2; in illustration of the procedure under the invention. I first build a rectangular closed vessel 1, which, for convenience, I designate a scow. It is constructed in any suitable or proper manner of heavy planking with horizontal beams 2 and vertical braces or supports 3 and is water-tight. Upon this device I erect a superstructure of vertical braces 4 and horizontal beams 5 of greater dimensions than the scow, so as to overhang the same as indicated. Over the top of this I place a series of water tanks or compartments 6, preferably separated by partitions, so that by filling some of them more than others with water the structure may be exactly leveled.

To the sides and ends of the superstructure there are secured vertical girders or angle irons 7 extending from about the bottom of the water tanks to a few feet below the superstructure, or to about the level of the bottom of the scow, and the lower girders or beams of the superstructure overhanging the scow as well as the inner sides of the vertical girders 7 are then covered with water-tight planking.

To afford access to the interior of the scow an air-lock tube 9 extends from the top of the device into the scow, and similar air-lock tubes 10 and 11 extend from the same point through the space or spaces at the side under the overhang. In Fig. 2 there are also shown the piles 12 which pass down through stuffing boxes in the device and which, as above set forth, are driven to guide, support and steady the structure.

Figures 6, 7, 8, 9, 10, 11:
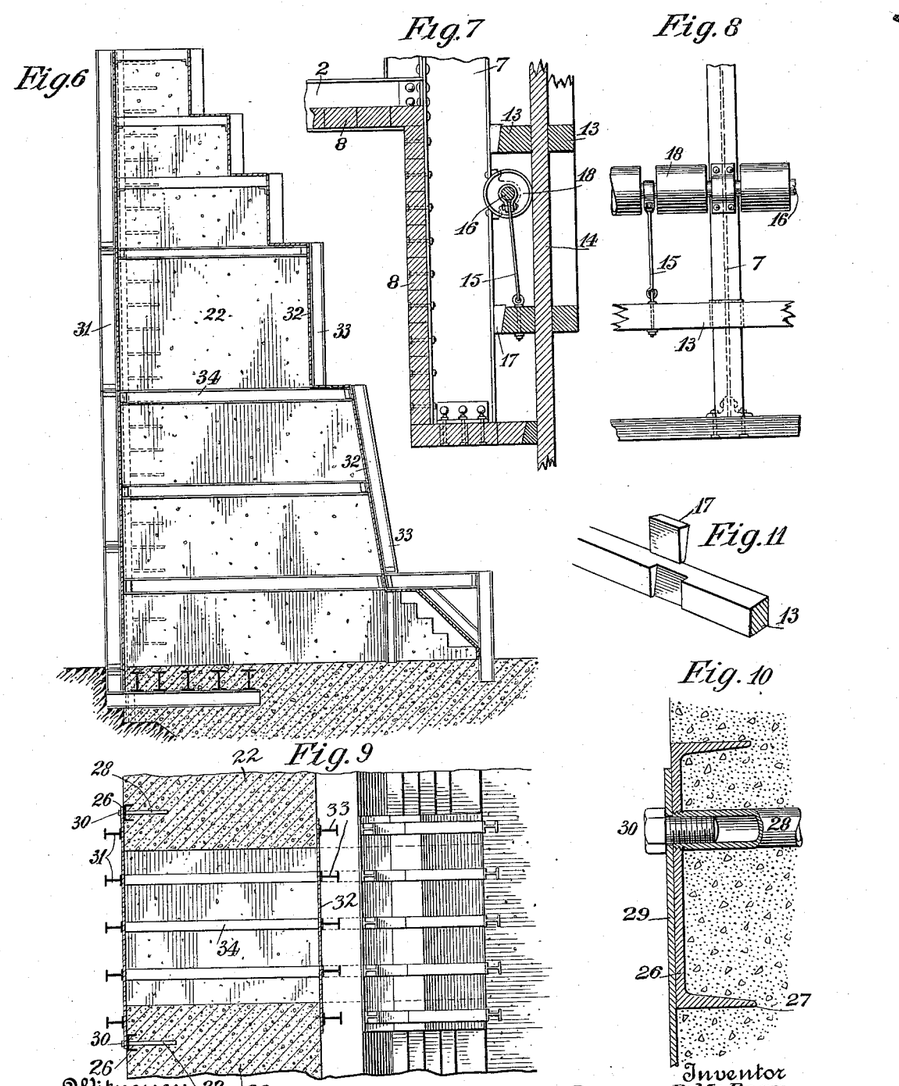
Fig. 6 is an end view of a completed section of side wall of the dry dock.
Fig. 7 is a sectional detail view of the walings, sheeting and means for supporting the structure within the latter.
Fig. 8 is a view in elevation of the same.
Fig. 9 is a part sectional view illustrating the means for making joints between sections of side walls.
Fig. 10 is an enlarged sectional view of a detail of the same.
Fig. 11 is a detail view of a wedging device.

On each side of the structure there are walings 13 which are frames for supporting and guiding the sheeting 14. The details of these parts as shown in Figs. 7, 8, and 9, comprise frames 13, which are secured to the vertical girders 7 by hangers or straps 15 attached to the frames and suspended from shafts 16 carried by the said girders. Wedges 17 are adapted to be driven into recesses in the frames for the purpose of adjusting the distance of the latter from the sheeting and on the shaft 16 there are also placed a series of iron or steel rollers 18 which, when the structure is raised or lowered, with respect to the sheeting bear upon the latter and permit a free movement of the device up or down. Before the sheeting is driven it is temporarily secured to the structure by bolts 19, Fig. 2, passing through it and the walings.

The girders 7 are of considerable width and as the sheeting is at a certain distance from them a considerable space between the walls of the structure proper and the sheeting is afforded, which may be filled with water to counterbalance the pressure on the outside of the sheeting.

Figure 4:
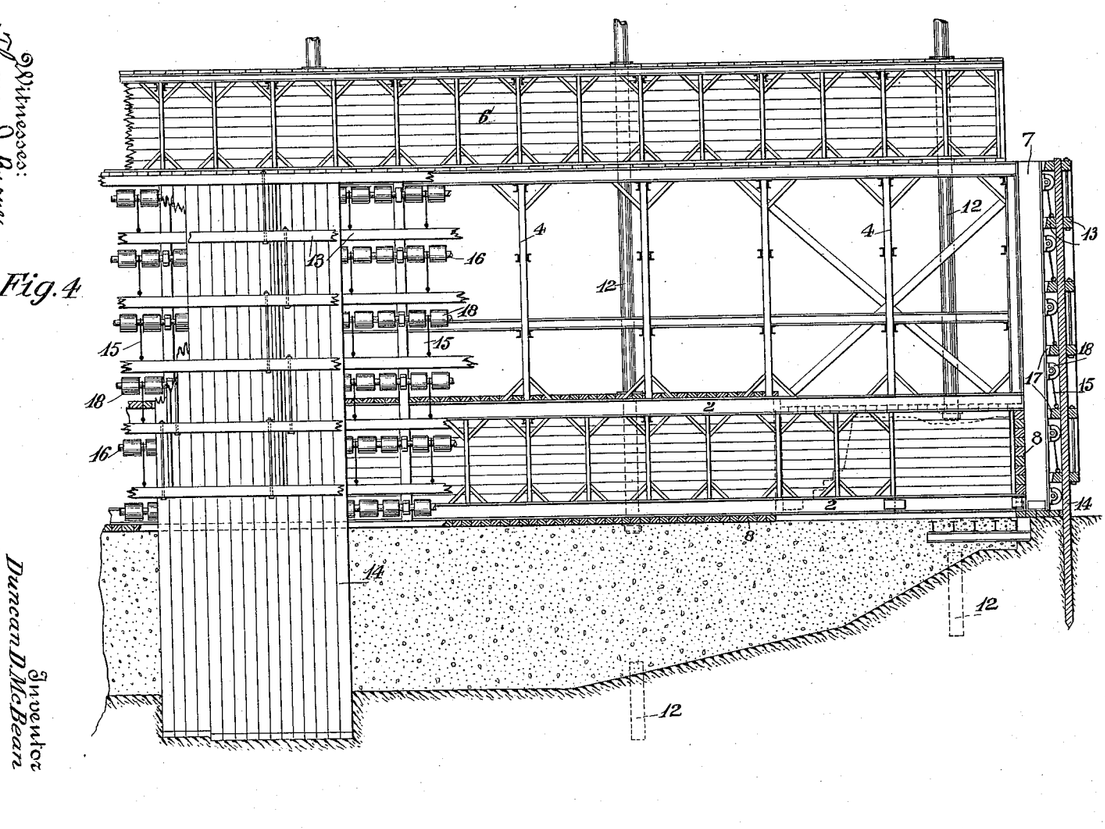
Fig. 4 is a view in elevation and part section of the structure resting on the concrete flooring of a section of dry-dock.

From the description given above, the operation or mode of use of this structure will be understood without difficulty. The structure having been floated to a point over the site of the section of dry-dock which is to be built, or over the site where the channel or river bottom is to be deepened by excavation, the water tanks or compartments are filled until the load is sufficient to sink the whole device to the bottom. The sheeting is then released and driven for a certain distance around all four sides of the structure and the piles 12 are driven and are provided with collars 20 which support the structure in a level position. Workmen then descend through the air-lock tubes 11 into the spaces beneath the overhang and excavate the material below the level of the scow down to the point where the foundation is to be built. This may require the whole device to be lowered by several steps and a corresponding driving of the sheeting and piles to the positions indicated in Fig. 4. The floor and the side walls 21 and 22 of the dry-dock are then built up of concrete, the side walls being extended up into the spaces under the overhang, and as this process goes on the sheeting is withdrawn and the structure raised by flotation until the top of the side walls is above the level of high water. When this has been done a portion of the ends of the sheathing-walls depending from the overhang are removed as shown in Fig. 1 and the whole remaining portion is then floated from over the completed section to a point over the site for the next section.

Figure 12:
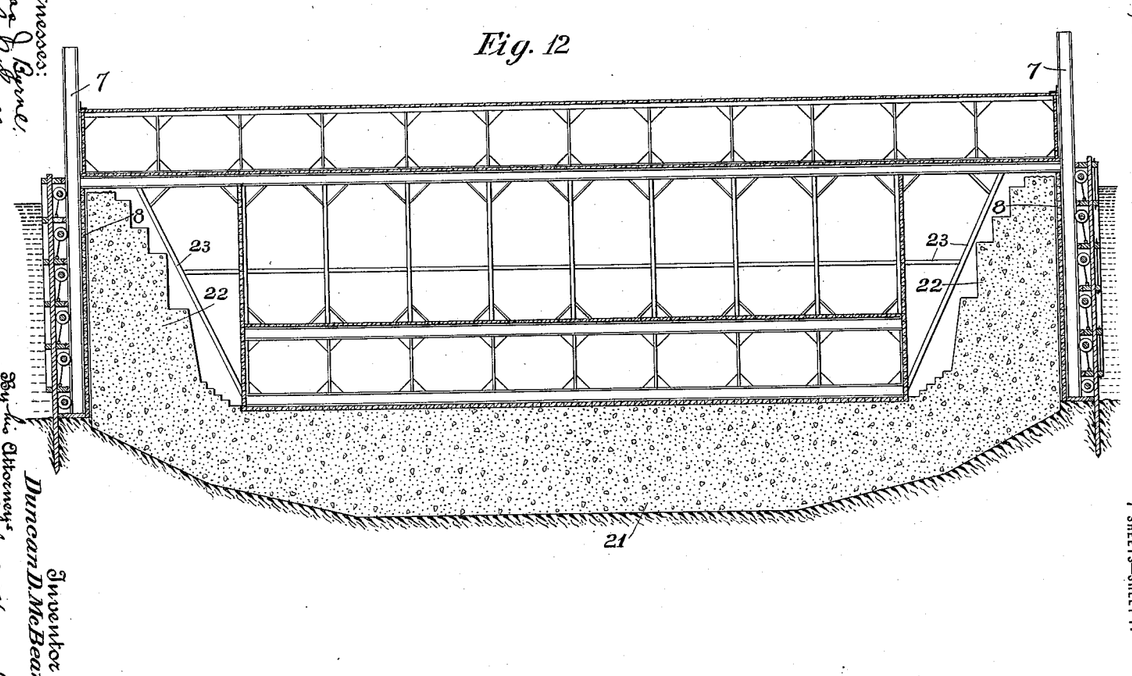
Fig. 12 is a cross-sectional view of a modified structure in position over an uncompleted section of dry-dock.

In Fig. 12 I have shown a modification of the structure which is permissible, and in some cases advantageous. In this form of construction the planking is carried up from the scow directly to the bottom of the water compartment, being secured to the vertical side beams or girders mounted on the scow, and the water-tight space under the overhang is completed by the planking 8 secured to the inner sides of the vertical girders 7 up to the bottom of the water tanks. The latter, where they overhang may be supported by braces 23, and a much larger and higher space for the side walls is thus secured. With this construction it is possible to sink the structure, excavate the material under it and build the dry-dock foundations floor and walls nearly or substantially complete before floating the structure for its removal to a new site.

In the construction of a dry-dock according to the plan above outlined it is necessary to observe certain precautions in connecting one to another completed section and the steps which it is necessary to follow under such circumstances will now be described.

Figure 3:
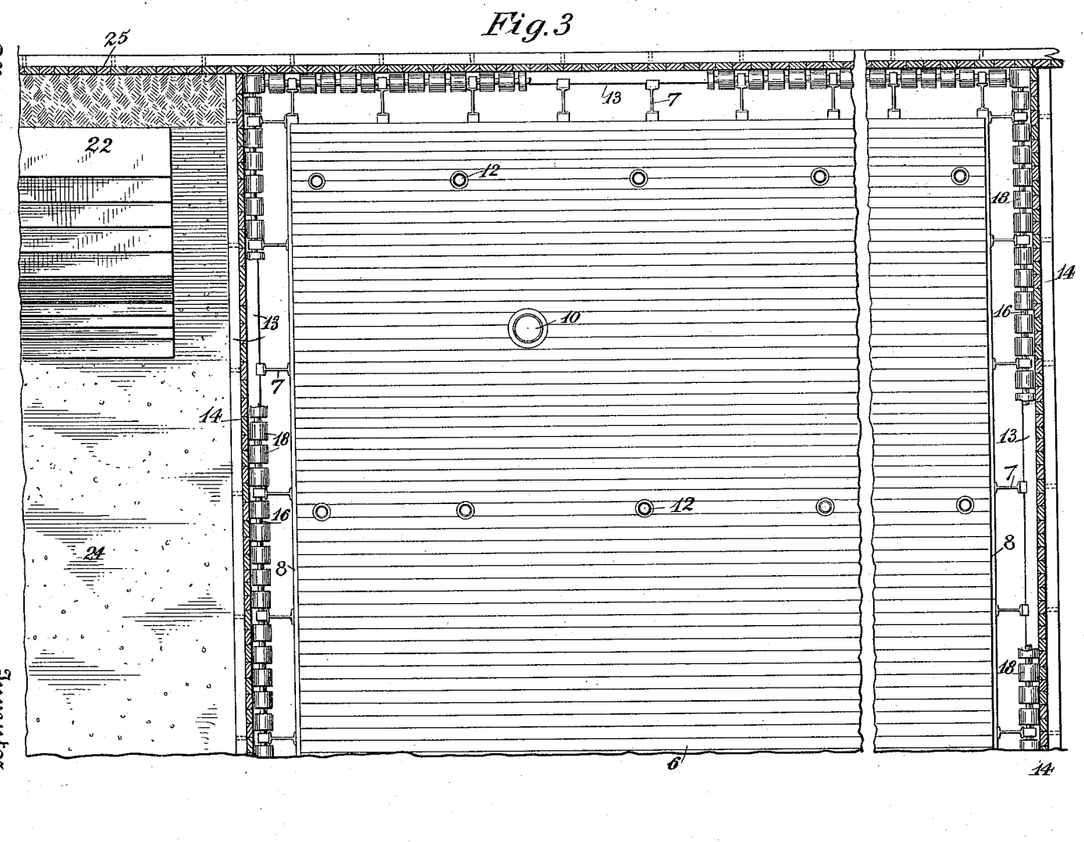
Fig. 3 is a top plan view of a portion of the structure resting over an uncompleted section of dry-dock, alongside of a completed section.
Figure 5:
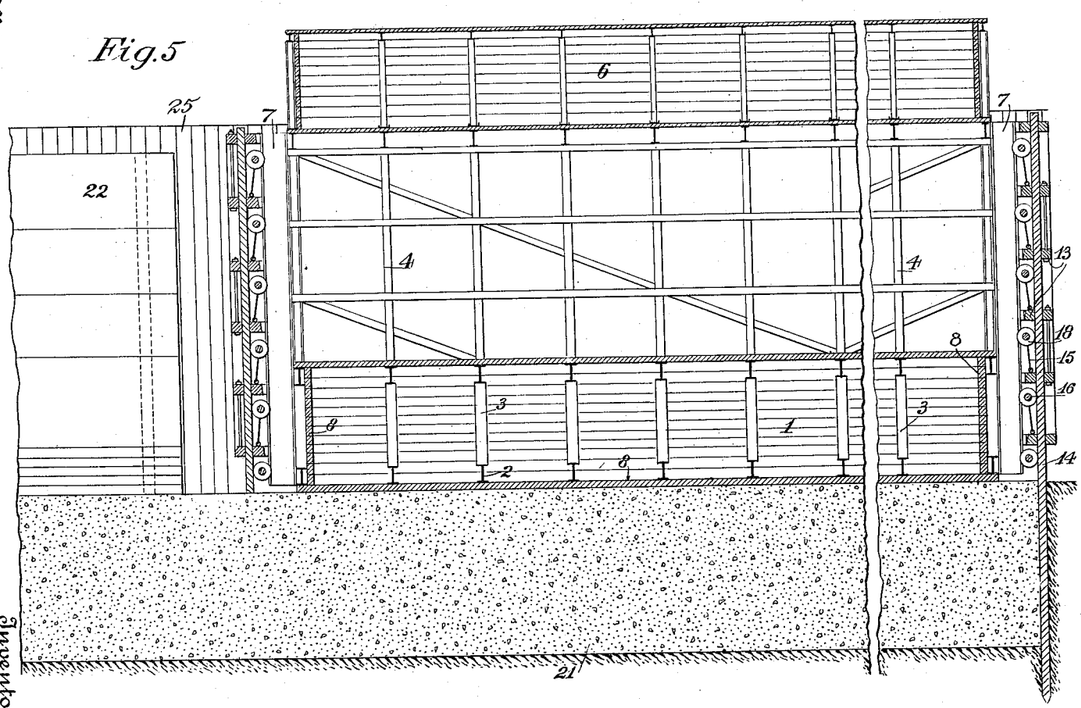
Fig. 5 is a sectional elevation illustrating the method followed in joining one section of dry-dock to another already completed.

When a section of the concrete floor and side walls is being constructed, the former is carried out beyond the latter toward and over the site of the next adjacent section, as shown in Fig. 3, in which 24 designates that portion of the flooring or foundation which is continued beyond the side walls 22. Then when the structure is floated from its first to its next position the sheeting across one end of the structure is driven down upon this extension and cement or earth piled against the bottom in the completed section in order to prevent any tendency of the water to run under the sheeting. As shown also in Figs. 3 and 5, the sheeting 25 forming an extension of that along the sides of the structure, is driven or left in to form a wall between the completed side walls and the structure.

When by the means above described the second section of the floor and foundation and side walls has been built, the ends of the two sections of side walls will be separated by a space as indicated in Fig. 9, in which the two side walls are marked 22. To fill this space and complete the side walls I proceed as follows: As the walls go up I cast into them plates of iron or steel 26 with flanges 27 and rods or tubes 28 screwed into the plates. The surfaces of the plates 26 are flush with the outside of the walls as shown in Fig. 10. Then when the walls are finished, metal plates 29 are secured to the plates 26 by screw bolts 30 entering the hollow ends of rods 28 and are braced by angle irons 31. On the inside of the walls, also, plates 32 are laid across the open joints and braced by angle irons 33, thus forming a mold with horizontal braces 34, if so desired, into which concrete may be run or built up to fill up the space between the ends of the walls and make the latter continuous. The plates, both inside and outside, are removed after the concrete has set. When in this way the dry-dock has been built the structure used in its construction is floated off and may be used again whenever occasion requires.

It is evident that by the plan above set forth a dry-dock may be built at a comparatively low cost with a minimum of excavation, and with the use of only such appliances as are permanently available for future constructions. As the work to be done is confined almost wholly to construction, a great saving in time and material is effected, and a strong finished and durable structure will be obtained.

It is evident that the device may be sunk down upon a site to be deepened in a channel or river bottom, forming a working chamber wherein the excavation can be made.

What I claim is:

1. A structure for use in building dry-docks and like purposes consisting of a water-tight compartment capable of floating the structure and all its appurtenances, air-tight chambers along its sides open at the bottom in which the side walls may be built up from the foundation when the structure is sunk to the bottom, water compartments for loading the structure, and anti-friction devices upon the sides of the structure for running over the face of surrounding sheeting when the structure is raised or lowered.

2. A structure for use in building dry-docks and like purposes, consisting of a water-tight compartment capable of floating the structure and all its appurtenances, air-tight chambers along its sides open at the bottom in which the side walls may be built up from the foundation when the structure is sunk to the bottom, walings and sheeting supported from the sides of the structure and anti-friction devices between said structure and the sheeting.

3. A buoyant mobile structure for use in building dry-docks and like purposes containing air-tight chambers along its sides open at the bottom, within which the walls of the dry-dock may be built up from the foundation when the structure is sunk to the bottom.

4. A structure for building sections of dry-dock consisting of a water-tight vessel or scow, a superstructure built thereon with water tanks or compartments for loading and sinking the structure, said superstructure overhanging the scow, and water-tight chambers along its sides open at the bottom, formed under the overhang.

5. A structure for building sections of dry-dock consisting of a water-tight vessel or scow, a superstructure built thereon with water tanks or compartments for loading and sinking the structure, said superstructure overhanging the scow, water-tight compartments open at the bottom under the overhang, walings and sheetings supported from the sides of the structure, and anti-friction devices between the structure and the sheeting.

6. A structure for excavating sites in channel and river bottoms, comprising in combination, a water tight scow, a superstructure and compartments which when filled load and sink the same and water-tight compartments open at the bottom on the sides of the scow to form chambers in which the work of excavation may be carried on.

7. A structure for excavating sites in channel and river bottoms comprising in combination, a water tight scow, a superstructure and compartments which when filled load and sink the same, compartments at the sides of the scow which are open at the bottom to form chambers in which the work of excavation may be carried on, and anti-friction devices upon the sides of the structure for running over the surrounding sheeting when the structure is raised or lowered.

In testimony whereof I affix my signature in the presence of two subscribing witnesses.

DUNCAN D. McBEAN.

Witnesses:
THOMAS J. BYRNE,
JOHN J. BULLEID.

Copies of this patent may be obtained for five cents each, by addressing the "Commissioner of Patents, Washington, D. C."